US006836883B1

(12) United States Patent
Abrams et al.

(10) Patent No.: US 6,836,883 B1
(45) Date of Patent: Dec. 28, 2004

(54) METHOD AND SYSTEM FOR COMPILING MULTIPLE LANGUAGES

(75) Inventors: Bradley M. Abrams, Kirkland, WA (US); George H. Bosworth, Woodinville, WA (US); Christopher W. Brumme, Mercer Island, WA (US); Patrick H. Dussud, Bellevue, WA (US); Brian D. Harry, Woodinville, WA (US); James S. Miller, Bellevue, WA (US); Vance P. Morrison, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 09/598,105

(22) Filed: Jun. 21, 2000

(51) Int. Cl.[7] ................................................. G06F 9/45

(52) U.S. Cl. ..................................... 717/140; 717/143

(58) Field of Search ............................... 717/140–146, 717/162–167, 136–139, 116, 127, 106, 148

(56) References Cited

U.S. PATENT DOCUMENTS

| 5,339,424 | A | * | 8/1994 | Fushimi ..................... 717/146 |
| 5,577,253 | A | * | 11/1996 | Blickstein ................... 717/156 |
| 6,058,455 | A | * | 5/2000 | Islam et al. ................. 711/114 |
| 6,067,413 | A | | 5/2000 | Gustafsson et al. ......... 717/114 |
| 6,282,670 | B1 | * | 8/2001 | Rezaul Islam et al. ......... 714/6 |
| 6,336,161 | B1 | * | 1/2002 | Watts ......................... 711/103 |
| 6,560,699 | B1 | * | 5/2003 | Konkle .......................... 713/1 |

FOREIGN PATENT DOCUMENTS

GB          1 367 741          9/1974

OTHER PUBLICATIONS

Manual page of gcc (http://www.freebsd.org/cgi/man.cgi?query=gcc&apropos=0&sektion=0&manpath=FreeBSD+4.8–RELEASE&format=html), 1998.*

Manual page of ar (http://www.freebsd.org/cgi/man.cgi?query=ar&apropos=0&sektion=0&manpath=FreeBSD+4.8–RELEASE&format=html), 1999.*

Standard output of command, 'ar': contents of '/usr/lib/libbz2.a', print out of files in '/usr/lib/libbz2.a'.*

Manual page of gcc (http://www.freebsd.org/cgi/man.cgi?query=gcc&apropos=0&sektion=0&manpath=FreeBSD+4.8–RELEASE&format=html), 1998, Free Software Foundation, p. 10.*

Manual page of ar (http://www.freebsd.org/cgi/man.cgi?query=ar&apropos=0&sektion=0&manpath=FreeBSD+4.8–RELEASE&format=html), 1999, Free Software Foundation, p. 2.*

(List continued on next page.)

*Primary Examiner*—Wei Y. Zhen
(74) *Attorney, Agent, or Firm*—Merchant & Gould P.C.

(57) ABSTRACT

A method and system for compiling multiple source language files that share a common library. The common library is represented in a common language that can be used by multiple different source languages. Font end compiler systems read the common language files that make up the common library and the source language files that use the library. Additionally, the front end systems produce common language files. The common language files produced by the front end systems can be used in the common library. The common language files may also be supplied to a back end system or runtime environment that further compiles the common language file to an executable form and executes the file. At runtime, the common language file is used by the runtime environment to layout the objects and methods used during execution.

10 Claims, 7 Drawing Sheets

OTHER PUBLICATIONS

Gosling, J. et al, "The Java Language Environment. A White Paper", Sun Microsystems Computer Company, Oct. 1, 1995, pp. 1, 4–85, XP 002042922.

European Search Report for EP 01 11 5100.

Andrew Johnson, James Loveluck and Ira Goldstein; *The ANDF Technology Program at the OSF RI;* Dec. 8, 1992.

Christian Fabre, Francois de Ferriere, Fred Roy, *Java–ANDF Feasibility Study Final Report;* Mar. 26, 1997.

Dr. N.E. Peeling; *ANDF Features and Benefits;* Feb. 5, 1993.

* cited by examiner

METHOD AND SYSTEM FOR COMPILING MULTIPLE LANGUAGES

TECHNICAL FIELD

The present invention relates to source language compiler technology and particularly to the use of compilers to create a runtime library and environment that is independent of the source language used to generate the executable programs or applications that execute in the runtime environment.

BACKGROUND OF THE INVENTION

Compilers are computer programs that read applications or programs written in one language, i.e., a source language such as a high-level programming language, and convert the source language program into a second language, i.e., a target language. Additionally, compilers typically perform other functions, such as reporting errors and importing other files or libraries for use by the source language file. The product of a compilation is typically a machine code language that can be executed directly on a particular processor in a particular operating environment.

Generally, the compilation process involves two parts, a front end portion for doing analysis and a back end portion for performing synthesis. The front end analysis parses the source language file, checks for lexical, grammatical or syntactic problems, and creates an intermediate representation of the source language file. The synthesis step analyzes the intermediate representation of the source language file and generates the target language file from the intermediate representation. The back end synthesis primarily depends on a particular target machine and is relatively independent of the source language used in creating the source file. On the other hand, the front end analysis depends primarily on the specific source language used and is relatively independent of the target machine.

There are at least three types of high-level programming languages in use today. The primary types of languages may be classified as procedural languages, functional languages, and object oriented programming languages. Additionally, each specific programming language has an associated library of functions that may be used by a software developer using that language. For example, almost every programming language has an input/output library of functions to allow the user to read information from an input device, such as from a file or a keyboard, and to write information to an output device such as a file, a display or a printer. In order to use this library of functions, the source language file has an "include" or "import" statement that indicates to the compiler the name of the desired library file.

During compile time, a language-specific compiler reads the source language file, determines that a library declarations file is needed and continues by reading the library declarations file. Importantly, in order for the library declarations file to be handled by the compiler, the library declarations file must be written in the native language for that compiler, i.e., the same language as the source language file. For example, if a user writes a source level program in C++ and the program uses a library declarations file, such as "stdio.h", then the library declarations file must be written in C++ so that the C++ compiler can read and understand the library declarations file. At runtime, the resulting executable program must execute along with a library program file that supplies the implementation of those items from the library declarations file actually used by the source language program written by the user.

One particular drawback associated with front end portions of compilers relates to the fact that only one type of source language file can be "consumed" by a particular front end. That is, compilers only compile files written in a particular source language and are not flexible in receiving other source language files. Moreover, the library declarations files that are imported by a compiler must also be written in the particular source language associated with a particular compiler. Unfortunately, different source languages provide benefits or advantages in performing some functions over other programming languages and many such benefits are associated with specific library functions. Since compilers for one language cannot use a library declarations file written in another language, library declarations files are often translated or rewritten into other source languages so that the library functions may be used by other source languages.

It is with respect to these considerations and others that the present invention has been made.

SUMMARY OF THE INVENTION

The present invention relates to a front end compiler system that compiles received information into two forms, metadata and instruction code either of which may be fed back into either the same or another front end system. The metadata contains information that describes the instruction code, which can be used by a front end system during a later compilation. The instruction code, also referred to as executable instructions can take many forms, such as object code directly executable on a processor or an "intermediate" type instruction code that may be executed on a back end execution environment. Since different front ends may read different source languages, and since each front end may also read the output of any other front end, a system is presented where a particular set of functionality created in one source language, using a front end adapted to that language, may be directly utilized by a front end adapted to a different language. This allows developers to use a source language particularly well suited to one type of problem to create functionality that can then be directly used by a program, component, or other entity created in a different source language.

Thus, the present invention relates to both a front end compiler system that produces metadata and executable instruction information and a front end compiler system that is able to compile this new information in addition to being able to compile a native source language file. In essence, a front end system of the present invention generates an common language file that can be both executed on a processor or other back end execution system and also compiled into another file, e.g., an executable file for execution on a target computer system or yet another front end system.

The present invention also relates to a system having multiple front ends that consume multiple programming languages and share a common library of functions. The common library is represented in a common language that can be used by multiple different source languages. The front end compiler systems read the common language files that make up the common library and the source language files that use the library. Additionally, the front end systems produce common language files. The common language files produced by the front end systems can be used in the common library. The common language files may also be supplied to a back end system or runtime environment that further compiles the common language file to an executable form and executes the file. At runtime, a library program file corresponding to the common language library file is used by the runtime environment to layout the objects and methods used during execution. Additionally, the back end portion may be targeted for a particular machine.

In accordance with other aspects, the present invention relates to a system for compiling a computer program written in a native source code language that has a plurality of front end compilers. Each front end compiler is associated with a different native source code language and each front end compiler consumes common language information in addition to its native source code. Moreover, each front end compiler produces a common language file that can be consumed by a runtime environment that is targeted for a particular machine. Additionally, the runtime environment has a loader for loading the common language file into the runtime environment and a layout engine for examining the common language file and determining the layout for classes and objects used at runtime.

In accordance with yet other aspects, the runtime environment of the system also provides at least one of a plurality of services such as a loader that loads executable instructions into memory for execution, a stack walker that keeps track of a call stack during runtime, a layout engine that determines the layout of instructions and data in memory, security services for the environment, developer services such as debugging or profiling, and memory management services such as a garbage collector for managing memory during runtime.

The present invention also relates to a front end compiler that produces common language files, wherein the common language file has a common language instructions section and a metadata portion that describes the common language instructions in the common language instructions section. The front end compiler is adapted to compile native source code files and a common language file. The front end may receive the entire common language file and use either only the metadata portion of the common language file or both the metadata portion and the executable instructions. Alternatively, the front end may require that the common language file be split so that only the metadata portion is received for use. Moreover, the common language file may be part of a common language library that may be consumed by different front end compilers associated with different native source code languages, such as procedural, functional and object oriented programming languages. Thus, the common language library describes functions for use in multiple, different programming language files.

In accordance with still other aspects, the present invention relates to a method of compiling a computer program that imports a common library file. The method determines that the source language file has an import statement relating to a common library file and reads the common library file into a symbol table and then compiles the remaining source language file using the symbol table.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

In general, the present invention is embodied in a front end compiling system and process involving the parsing and analyzing of more than one source language to produce a common language file that may then be read by the same or another front end system. An embodiment of the invention is able to read and parse a source language file that includes or imports a common library declarations file, wherein the common library declarations file is represented in a different language than the source language file. The two language files (source language and common language) are processed together, producing at least two portions, metadata and intermediate code having executable instructions. The two portions may be in one file, e.g., a common language file generated by the front end, or may be separate. The front end compiler system is capable of understanding and parsing files written in a specific programming language as well as reading and understanding a common library file represented in another, common language.

Figure 1:
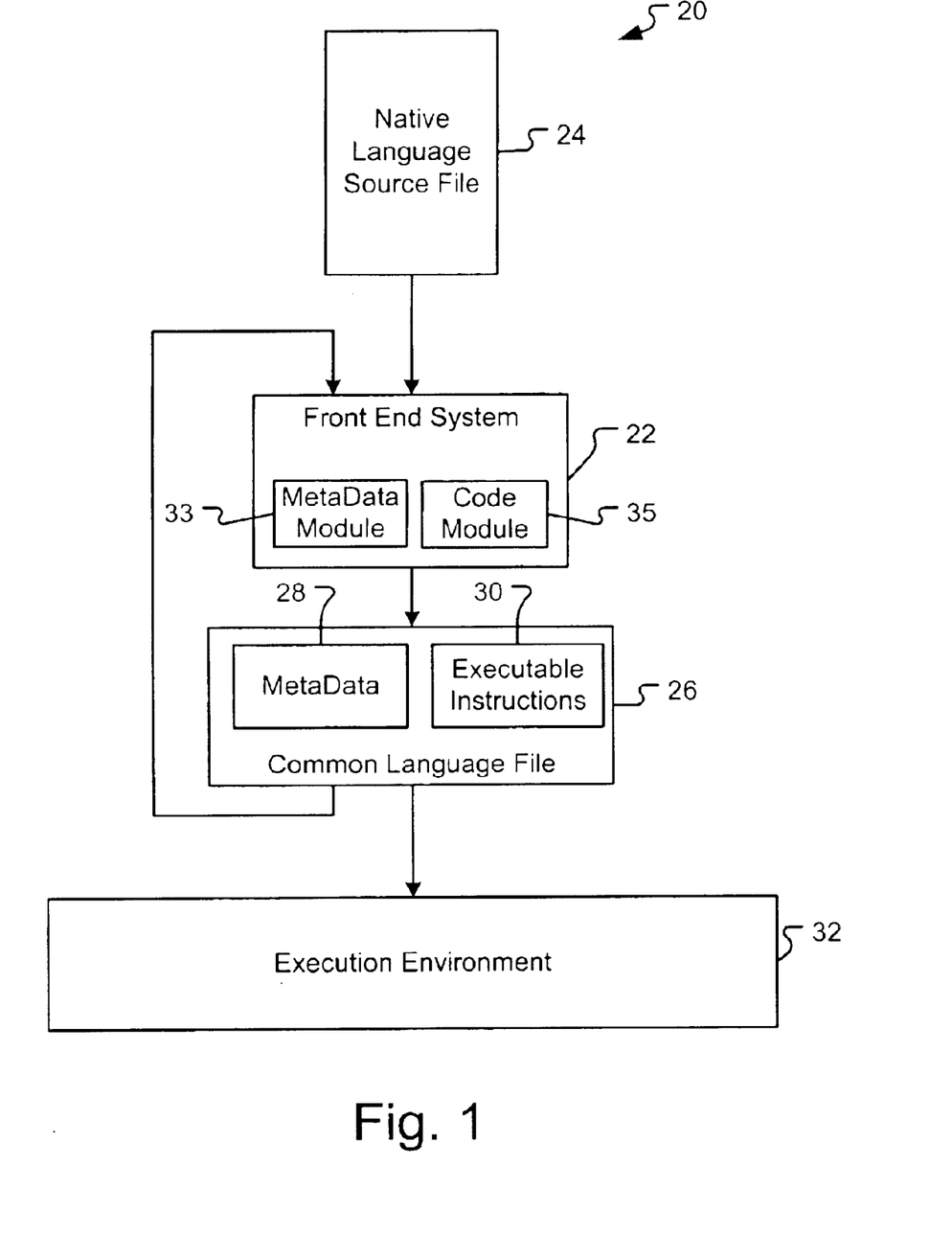
FIG. 1 illustrates the functional components of a software environment incorporating a front end portion of the present invention.

Functional software components of a system 20 that incorporates aspects of the present invention are shown in FIG. 1. The system 20 has a front end portion 22 that receives and compiles information, such as information from a native source file 24. The native source file 24 may be any type of source language file that is used for software development. The front end 22 produces a common language file 26 that can be fed back into the front end system 22 and/or executed by an execution environment, such as execution environment 32. As illustrated in FIG. 1, the output of front end 22 may include metadata 28 and executable instructions 30, wherein the executable instructions 30 may also be referred to as "instruction code." Executable instructions 30 can be either instructions that can be directly executed by a processor (e.g. object or native machine code) or an "intermediate" type instruction (e.g. Java bytecodes, p-code, or other intermediate language) that is executed within some type of execution environment. In one embodiment, executable instructions 30 comprise a "common" (in the sense of universal) intermediate language suitable for representing the concepts of a plurality of different types of source languages, so that only one type of intermediate language need be used regardless of the specific source language used. In FIG. 1, the output of frontend 22 is illustrated as being a common language file 26 containing a combination of both metadata 28 and executable instructions 30. Alternatively, the front end system 22 may generate two separate files (not shown), one for the metadata 28 and one for the executable instructions 30. In alternative embodiments, the front end system 22 may only produce either metadata 28 or executable instructions 30. Within the context of this application metadata includes any information that is useful to describe executable instructions 30. By way of example only (and not limitation), such metadata may include a description of the symbols or names used in the executable instructions, information about the data types used in the executable instructions, or any other information that would be useful either by front end 22 or execution environment 32. The metadata portion 28 is produced by a metadata module 33 within the front end system 22 and the executable instructions 30 are produced by a code module 35 within the front end system 22. The front end system 22 may read or receive either metadata 28, executable instructions 30 or a combination of both, such as the common language file 26 as shown in FIG. 1.

In addition to being fed back to the front end system 22, the common language file may also be transmitted to an execution environment 32. The execution environment may be either a managed run-time system, an unmanaged execution environment or a direct execution environment. In essence, the execution environment may be any back end type system that is capable of reading and using the information supplied by the common language file 26. Indeed, the execution environment may be a more typical back end system, as described in the background section, that receives the compiled information from the front end system and generates executable code from the compiled information.

Figure 2:
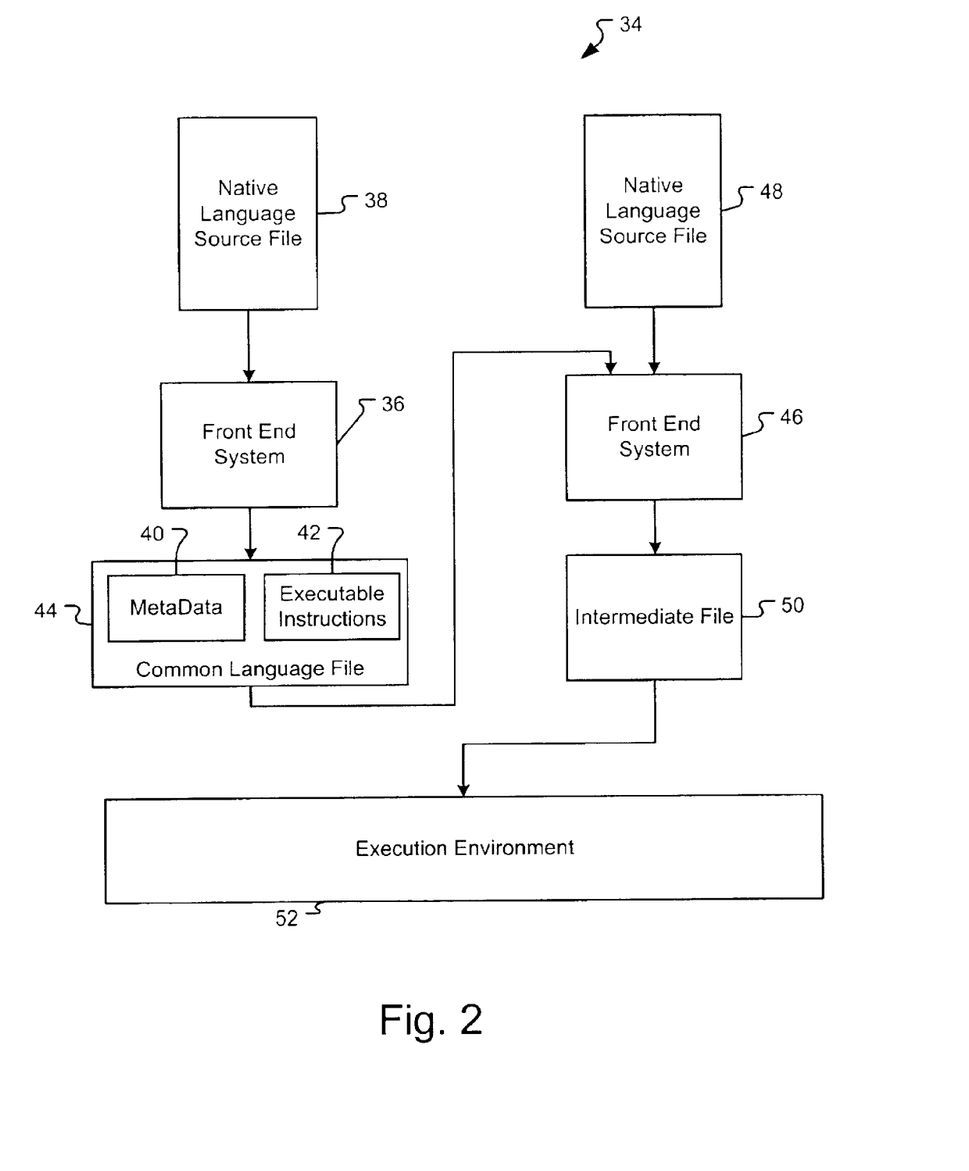
FIG. 2 illustrates the functional components of a software environment of an alternative embodiment of a front end portion of the present invention

A system 34 of functional software components for an alternative embodiment of the present invention is shown in FIG. 2. The system 34 has a front end system 36 reads a native source language file 38 and produces both metadata 40 and executable instructions 42. As shown in FIG. 2, the metadata 40 and executable instructions 42 may be in a single common language file 44. Alternatively, the two portions 40 and 42 may be part of separate files. The front end system 36 is similar to the front end system 22 shown in FIG. 1 in that both front ends 22 and 36 create metadata and executable instructions. The front end system 36, however, may or may not be configured to receive a common language file in addition to the native language source file 38.

The common language file 44 produced by front end system 36 can be read by another front end system, such as front end system 46. The front end system 46 reads the common language file 44, as well as the a native language source file 48 (either the same or different than native language source file 38). Additionally, the front end system 46 produces an intermediate file 50 that is then transmitted to an execution environment 52. The intermediate file 50 may have the same format as the common language files 44 and 26 (FIG. 1), or it may contain only executable instructions to be used by the execution environment 52. The execution environment 52 is similar to the environment 32 shown in FIG. 1 in that it may either be a managed environment, an unmanaged environment or a direct execution environment.

The front end system 46 is similar to the front end system 22 shown in FIG. 1 in that it is capable of receiving both a common language file, such as file 44 and the native language source file 48. However, the front end system 46 is different from the front end system 22 in that it may or may not produce a common language file having both metadata and executable instructions.

FIG. 2 illustrates particular functionality enabled by an aspect of the invention. Over time, various source languages have been created to be used in software development. Generally, source languages have evolved to express concepts and functionality particularly suited to solving particular problems or particular classes of problems. Thus, certain languages are particularly well suited to solve certain problems or express certain concepts. While languages have risen and fallen in popularity, no one has yet created a single source language that is well suited to solving all problems. Because the output of one front end can be directly accessed and utilized by another front end, different portions of an overall system may each be implemented in the source languages most suited to that portion of the system. For example, a reasoning or inference engine implemented in Lisp can be directly accessed and utilized in a program implemented in C++.

Figure 3:
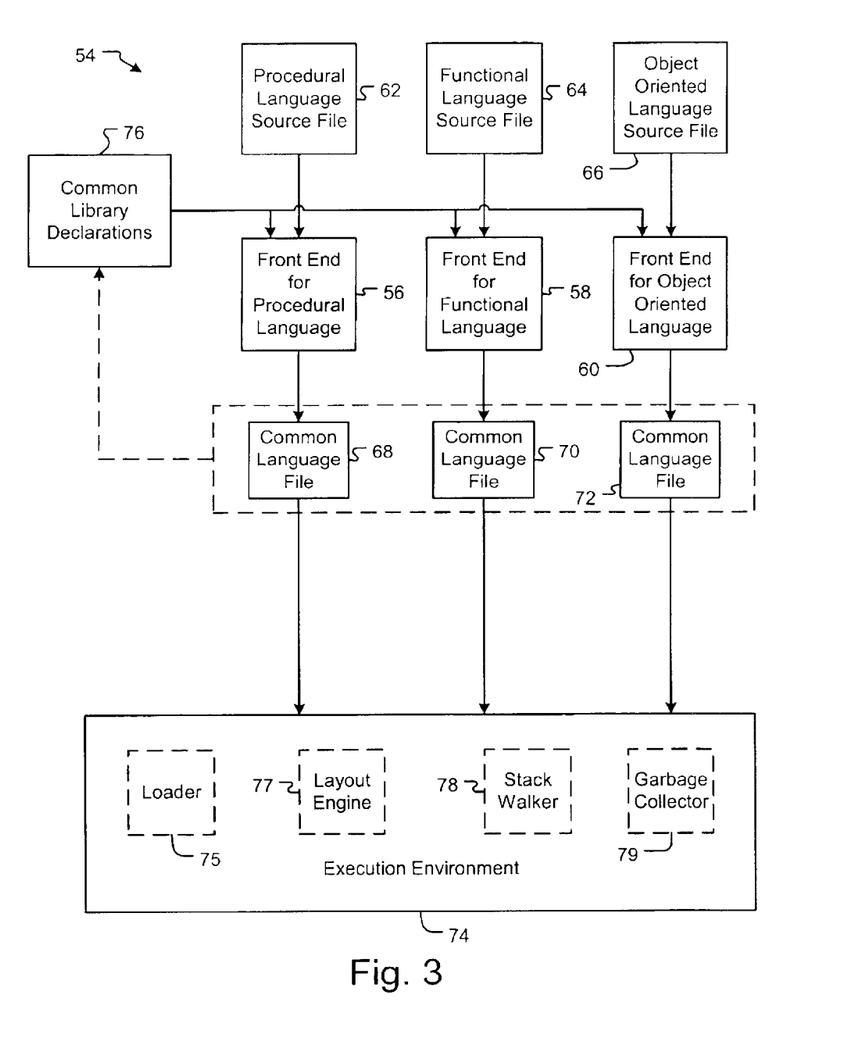
FIG. 3 illustrates the functional components of a software environment of another alternative embodiment of the present invention, illustrating the use of multiple common language files to generate a common library.

Functional software components of another system 54 that incorporates other aspects of the present invention are shown in FIG. 3. The system 54 incorporates at least one front end portion, such as portions 56, 58 and 60, which are not intended to show requirements of the present invention but merely to illustrate concepts of the present invention applied to multiple or combined front end systems. The front end portion 56, 58 and 60 are capable of parsing and analyzing different types of source language files, such as files 62, 64 and 66, respectively. The front end portions 56, 58 and 60 each produce a common language file 68, 70 and 72, respectively. The common language files 68, 70 and 72 are all represented in the same language and have the same format, as discussed in more detail below.

Once compiled, each file 68, 70 and 72 may then undergo optional processing as it is supplied to an execution environment 74. The execution environment 74 is similar to the execution environments 32 and 52 shown in FIGS. 1 and 2. Again, the environment 74 may be either a direct execution environment, a managed runtime environment or an unmanaged runtime environment. Further, the environment may be any other type of environment capable of reading and executing the compiled files 68, 70 and 72.

The front ends 56, 58 and 60, in addition to being able to read and analyze their respective source language files 62, 64 and 66, are capable of reading and analyzing files represented in the common language. Moreover, library declarations file 76 of functions represented in the common language is available for use by the front end portions 56, 58 and 60. In one embodiment, the common library declarations include files that have been compiled by a front end portion of system 54, such as front ends 56, 58 and 60, and made available to other developers through the library 76. In essence, the files available in the library 76 are in a common language format similar to the files 68, 70 and 72. Moreover, the common language files 68, 70 and 72 may become part of the common library of declarations 76 as indicated by FIG. 3.

Source language files 62, 64 and 66 may incorporate a combination of elements related to both the source language specific to a particular front end and the common language of the system 54. More particularly, the source language files 62, 64 and 66 have an "include" or an "import" type statement that declares the use of the common library declarations file 76. During the front end compilation, the import statement notifies the compiler to attain the available types, classes, methods, and other necessary information from the file 76, thereby allowing the use of any and all functions provided by the library 76. The remaining source file may then use the native source language syntax to call and use the functions provided by the library. In an environment of the present invention, the library 76 can be a superset of the library functions for a particular programming language while containing a representative cross section of available functions from a selected group of programming languages, such as Pascal, C, C++, etc. In other environments, different libraries (not shown) can be created to target a specific functionality. For example, one library may be targeted at Internet or World Wide Web application developers. As another example, a library may be created to target cell phone application developers, etc.

During runtime, the files 68, 70 and/or 72 are loaded into the execution environment 74. Generally, optional processing may be performed on the files, wherein the processing translates, interprets or otherwise converts the received common language file, such as files 68, 70 or 72, into object code that can be executed in the execution environment 74. Thus, the execution environment 74 loads the common language files 68, 70 and/or 72 and performs the operations necessary to execute these common language files.

Additionally, in the case where the execution environment 74 is a managed runtime environment, it may provide a number of other services during program execution. As an example the system may provide a loader 75, which receives the executable file and resolves necessary references and loads the code. The environment may provide a stack walker 77, i.e., the piece of code that manages the method calls and provides for the identification of the sequence of method calls on a stack at a given point in time. A layout engine 78 may also be provided, which establishes the layout, in memory, of the various objects and other elements as part of the application to be executed. The execution environment may further provide security measures to prevent unauthorized use of resources and other developer services, such as debuggers and profiling. Other types of services that can be provided by a managed execution environment include verification of code before it is executed, security facilities to determine whether certain code has permission to access certain system resources (or even execute at all), and memory management services, such as garbage collection 79.

The execution environment may further utilize a common library program file (not shown) which has the actual implementation information to carry out the functionality of the common library declarations 76. The environment 74 may use a conventional loader/linker to carryout the proper combinations of objects. In order for the execution environment 74 to be able to understand the various elements of the loaded file, such as files 68, 70 and 72, the environment 74 must understand the format of the loaded file. The runtime environment may shape objects prior to runtime using the information provided to the execution environment, such as the metadata.

Figure 4:
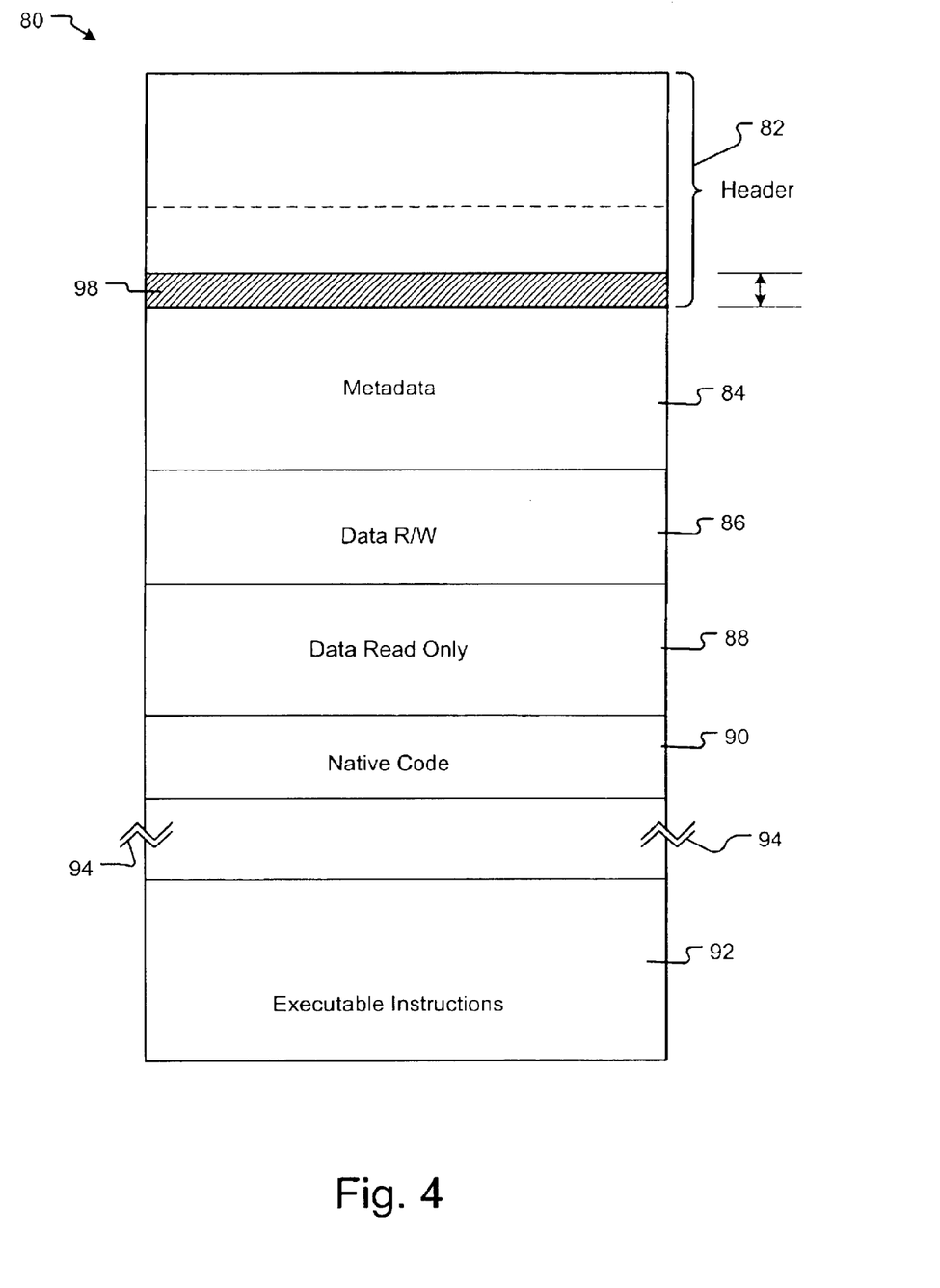
FIG. 4 illustrates the format for a resulting intermediate language file that may be produced using the front end portion shown in FIGS. 1, 2 and 3.

The format for an exemplary common language file 80, which is similar to files 68, 70 and 72, is shown in FIG. 4. The format shown in FIG. 4 is merely an example and is not meant as a limitation, as many other formats for a common language file are possible. The file 80, shown in FIG. 4, is a "PE" file and is in common COFF format, wherein COFF stands for Common Object File Format. COFF files have relatively standardized elements, such as a header 82 and multiple segments, such as segments 84, 86, 88, 90 and 92. Indeed, the file 80 may have more segments (as indicated by the breaks 94) since COFF defines a way to extend the format. None of the segments illustrated in FIG. 4 are necessarily required for any particular implementation of the present invention, except that provision needs to be made for the metadata and executable instructions produced by a front end, either in the same file or in different files as previously discussed. In the example shown in FIG. 4, the file 80 uses sections 86 and 88 for program data information, such as Read Write data in section 86 and Read Only data in section 88. Additionally, the file 80 may have a section, such as section 90 that has existing native code. Sections 84 and 92 relate to the common language information.

Section 84 holds metadata information that describes the common language instructions that are present in section 92. Section 92 may be the actual intermediate language result of a compilation process performed by a front end, such as one of the front ends 56, 58 and 60. This intermediate language code or common language instructions is used by the execution environment to compile the file to executable instructions and/or to execute the file. The metadata information describes the instructions in section 92 by outlining the types, classes, methods, properties and events present in the instructions 92. In an embodiment, the metadata section 84 is merely a listing of the components, by type.

The metadata section 84 is found by the runtime environment through the header 82, and particularly through an added portion 98 to the header 82. The added portion 98 provides information as to the location of the metadata section 84 within the file 80. The metadata section 84 provides the runtime environment 74 with important information related to the types, shapes and sizes of objects to be instantiated at runtime. The runtime environment 74 uses this information, through the use of a layout engine, to create method tables and allocate necessary space for the objects at runtime.

Additionally, the metadata section 84 is the portion of information that is used by front ends 22, 46, 56, 58 and 60 (FIGS. 1, 2 and 3) during the compilation process of a source file that calls a common language file, such as file 80. That is, the front ends 22, 46, 56, 58 and 60 (FIGS. 1, 2 and 3) generally do not read the remaining portions of file 80, as the front ends are primarily concerned with the description of the available functionality, so the symbol table can be loaded, and not concerned with the implementation details of the functions. These implementation details are then stored in the common library program file (not shown) and are loaded into execution environment 74 when needed. In an embodiment of the invention, when the file 80 is added to the common library declarations 76 (FIG. 3), the sections 86, 88, 90, and 92 are removed from the file since they are not necessary. In alternative embodiments, the front end systems may utilize information in the other sections and are therefore not removed.

FIG. 4 represents only one type of suitable file format and different file formats may also be used. For example, if a front end produces only native type executable code and metadata, then the segments of the file may be different either in number or contents. As another example, the metatadata is illustrated as residing in its own segment (84). However, the metadata may also be combined into one or more of the other segments. Additionally, metadata may reside both in its own segment and interspersed in other segments.

Figure 5:
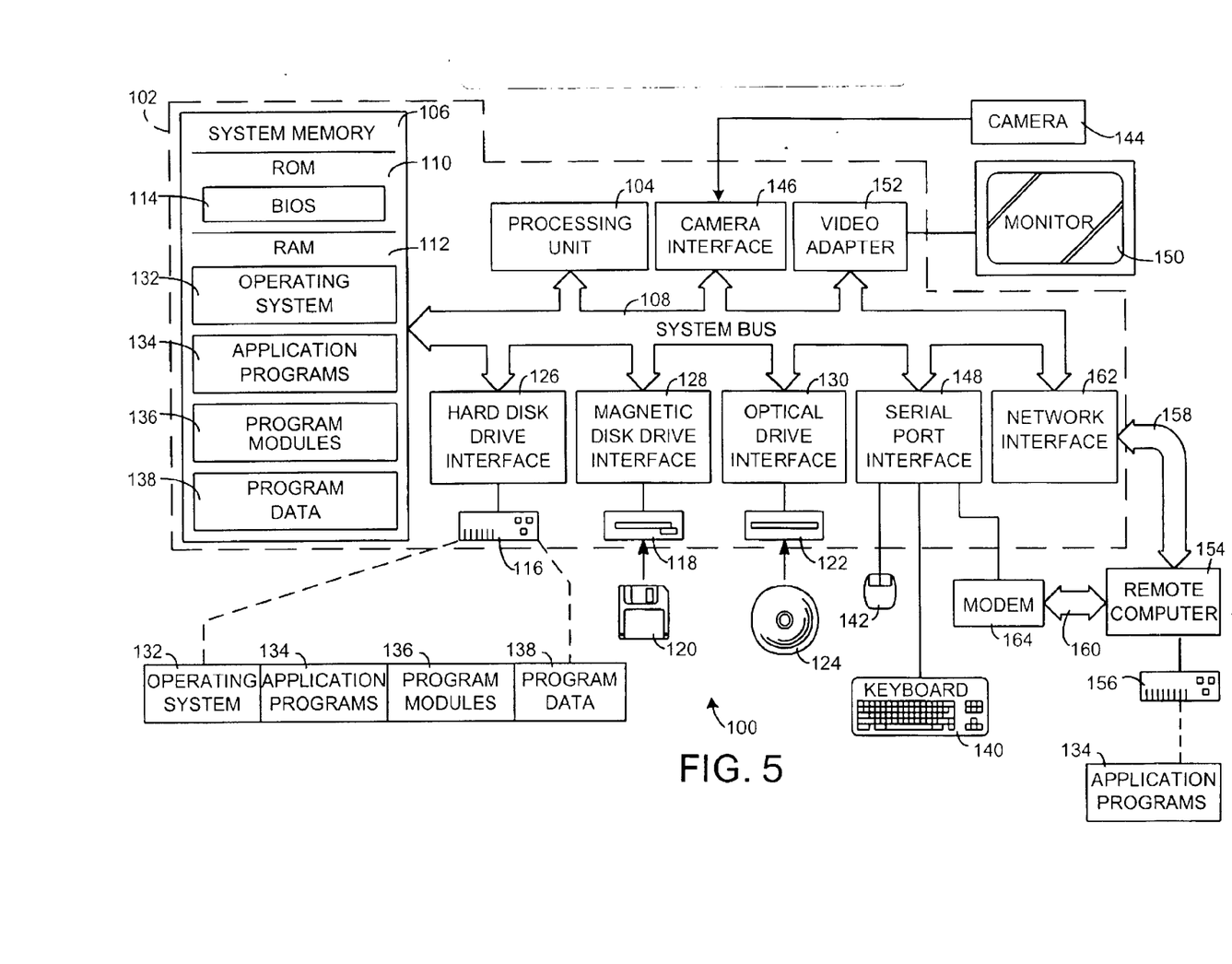
FIG. 5 is block diagram of a computer representative of the type of computer that may be used during the execution of an embodiment of the present invention.

FIG. 5 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system 100 for implementing the invention includes a general purpose computing device in the form of a conventional personal computer 102, including a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. The system memory 106 includes read only memory (ROM) 110 and random access memory (RAM) 112. A basic input/output system 114 (BIOS), containing the basic routine that helps to transfer information between elements within the personal computer 102, such as during start-up, is stored in ROM 110.

The personal computer 102 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media.

The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 102. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, CDs, DVDs, random access memories (RAMs), read only memories (ROMs), and the like, may also be used in the exemplary operating environment.

A number of program modules may be stored on the hard disk, magnetic disk 120, optical disk 124, ROM 10 or RAM 112, including an operating system 132, one or more application programs 134, other program modules 136, and program data 138. A user may enter commands and information into the personal computer 102 through input devices such as a keyboard 140 and pointing device 142 (such as a mouse). A camera 144 capable of capturing a sequence of images can also be included as an input device to the personal computer 102 through an appropriate camera interface 146, which is connected to the system bus 108. Other input devices (not shown) may include a microphone, joystick, game pad, satellite dish, scanner, or the like. These and other input devices are often connected to the processing unit 104 through a serial port interface 148 that is coupled to the system bus 108, but may be connected by other interfaces, such as a parallel port, game port or a universal serial bus (USB). A monitor 150 or other type of display device is also connected to the system bus 108 via an interface, such as a video adapter 152. In addition to the monitor, personal computers typically include other peripheral output devices (not shown), such as speakers and printers.

The personal computer 102 may operate in a networked environment using logical connections to one or more remote computers, such as a remote computer 154. The i; remote computer 154 may be another personal computer, a server, a router, a network PC, a peer device or other common network node, and typically includes many or all of the elements described above relative to the personal computer 102, although only a memory storage device 156 has been illustrated in FIG. 5. The logical connections depicted in FIG. 3 include a local area network (LAN) 158 and a wide area network (WAN) 160. Such networking environments are commonplace in offices, enterprise-wide computer networks, Intranets and the Internet.

When used in a LAN networking environment, the personal computer 102 is connected to the local network 158 through a network interface or adapter 162. When used in a WAN networking environment, the personal computer 102 typically includes a modem 164 or other means for establishing communications over the wide area network 160, such as the Internet. The modem 164, which may be internal or external, is connected to the system bus 108 via the serial port interface 148. In a networked environment, program modules depicted relative to the personal computer 102, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the operative modules embodying the invention. The logical operations of the various embodiments of the present invention are implemented (1) as a sequence of computer implemented steps or program modules running on a computing system and/or (2) as interconnected hardware or logic modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 6:
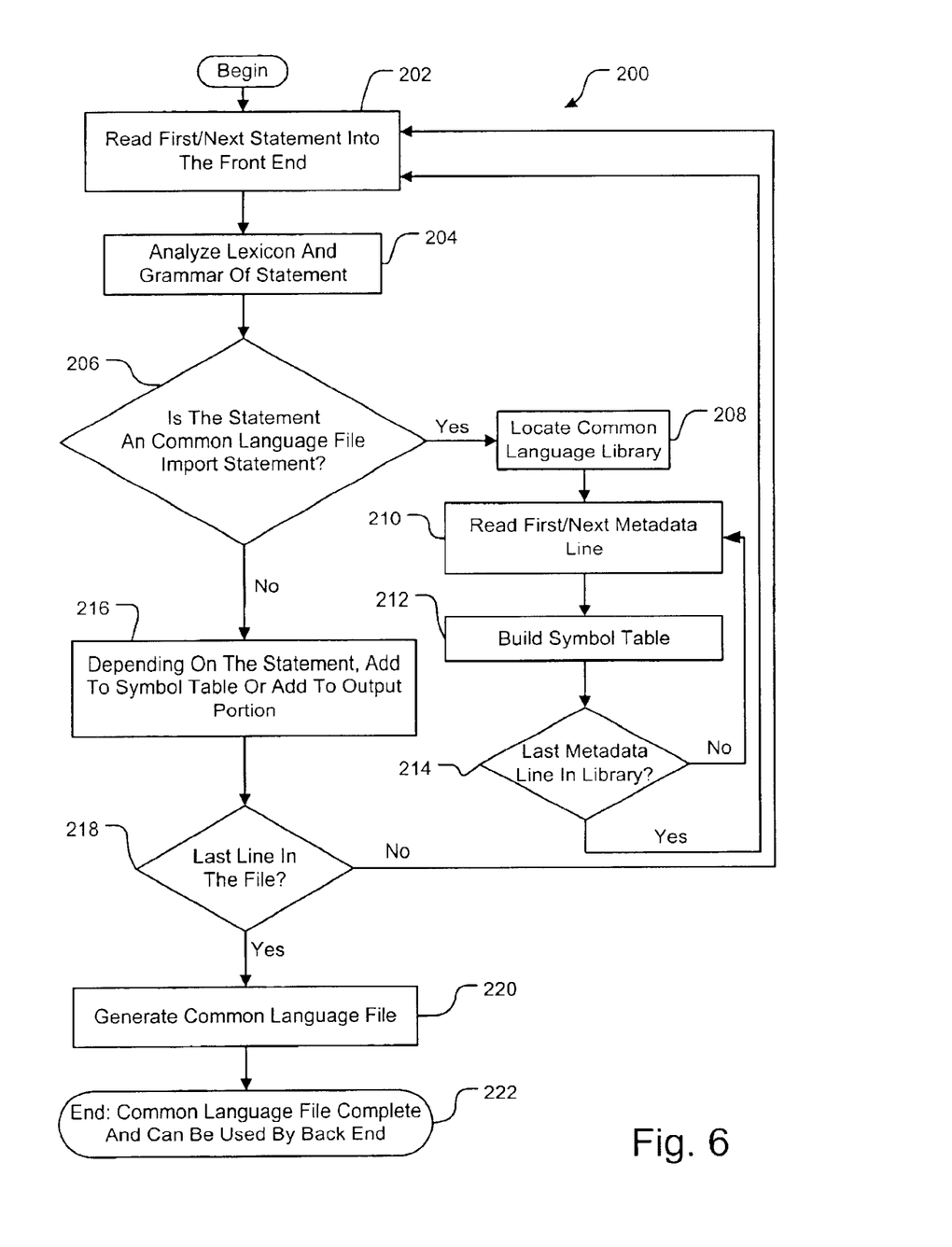
FIG. 6 is a flow diagram showing the operational characteristics of creating the intermediate language file shown in FIG. 4.

An example of the procedural flow 200 of operations performed by a front end system, such as front end system 22 (FIG. 1), front end system 46 (FIG. 2) or front ends 56, 58 or 60 (FIG. 3), to read a common language file is shown in FIG. 6. The flow begins with read operation 202, which reads the first statement in the native source file, such as one of the files 24, 48, 62, 64, or 66 respectively. Following the read operation 202, analyze module 204 analyzes the statement for the proper use of words, i.e., a lexical analysis, and for the proper grammar.

Following the lexical and grammatical analysis, assuming there are no errors, determination operation 206 determines if the statement is an import or include statement, attempting to import a common language file or library. A special import command may be used to indicate this type of file or, following the attempt at the import function, the actual library can be analyzed to determine if it is a common language library. Methods may be provided to the front end fuinctionality to give it the ability to notice that the file is a common language library.

If the library is a common language library, then flow branches YES to locate operation 208. Locate operation 208 essentially locates the file and starts the process of loading the file into the symbol table for the current compilation. Once located, read operation 210 reads the first line of the common library file. This may require the analysis of the header of the common language file to find the metadata section of the file, and then find the first line of the metadata section. Importantly, the primary information in the common library that is read is that metadata portion, e.g., section 84 (FIG. 4). The metadata, as discussed above is the information that describes the types, methods, arguments, etc. that provides the front end the ability to load the symbol table. Methods may be provided to the front end functionality so that the front end can read the common language file.

Next, build operation 212 builds or loads the symbol table according to the line of metadata that was read. Following build operation 212, test operation 214 determines whether there are more lines in of metadata information by determining if the current line is the last line. If there are more lines of metadata information, and thus the current line is not the last line, then flow branches YES back to read operation 210 and the next line is read. The flow effectively loops through all lines of metadata information to build the symbol table accordingly. When the last line has been stored in the symbol table, test operation 214 causes flow to branch NO back to read operation 202. Read operation 202 then reads the next line of the original source code file.

If determination operation 206 determines that the operation was not an include statement for a common language library, then flow branches NO to module 216. Module 216 analyzes the statement and determines whether to load information into the symbol table or provide the information to the output module. That is, for every statement in the file, either the symbol table is loaded or an output type statement is generated. Module 216 provides this aspect of the flow.

Upon completion of module 216 for the current statement, determination act 218 determines if the current statement is the last statement in the source code file. This operation may simply check for an end of file marker. If the statement is not the last statement in the file, flow branches NO back to read operation 202 and the next statement is read. If the statement is the last statement in the file, as determined by determination act 218, then flow branches YES to generate operation 220.

Generate operation 220 processes the output statements, as provided by the module 216, and generates an intermediate language file. This step is fairly common practice for compilers, i.e., the compilers produce some sort of data structure or intermediate language file. However, generate operation 220 also provides the metadata information as part of its output file, such as files 68, 70, or 72 (FIG. 3), and this metadata is the same type of metadata information that can be consumed by the front ends 22, 46, 56,58 and 60 (FIGS. 1,2 and 3).

Once generate operation 220 has completed, flow ends at end 222. The resulting file is a common language file that comprises both metadata information and common language instructions. Moreover, in an embodiment of the invention, the format of the resulting file is as shown in FIG. 4. The common language file can then be consumed by either other front end systems 22, 46, 56, 58 or 60 (FIGS. 1, 2 and 3), or an execution environment, such as environment 74 (FIG. 3).

Figure 7:
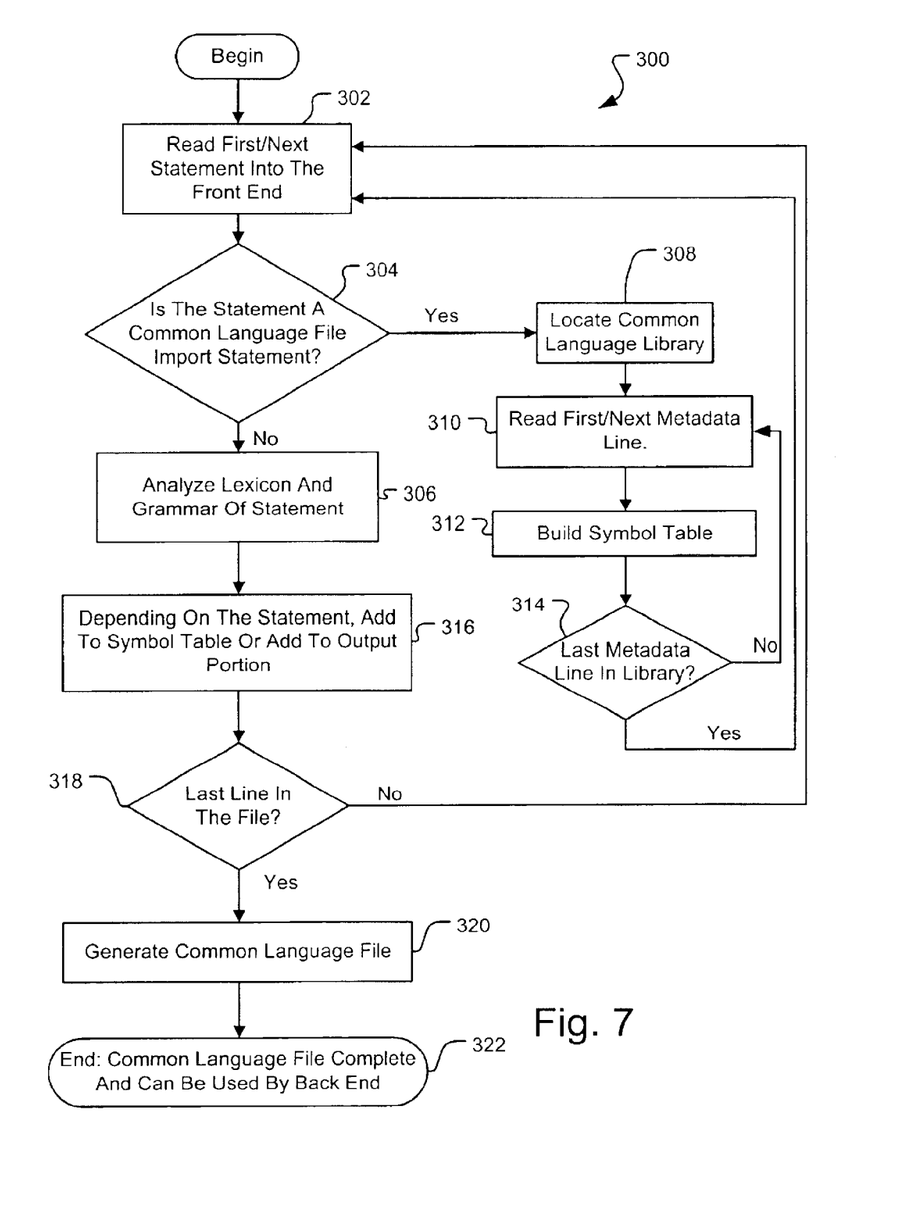
FIG. 7 is a flow diagram showing the operational characteristics of an alternative embodiment for creating the intermediate language file shown in FIG. 4.

FIG. 7 illustrates the operational flow for a front end portion in an alternative embodiment. In essence, the process is the same as that discussed above in conjunction with FIG. 6, except flow 300 determines at operation 304 whether a newly read statement is an import statement prior to any lexical or grammar analysis, which occurs at operation 306. That is, operation 302 is similar to operation 202 described above in that a new statement is read for analysis. Then determination step 304 determines if the statement relates to an import statement for a common library. If so, operations 308, 310, 312 and 314 are executed to load the information from the library into the symbol table. If not operations 306, 316 and 318 load the remaining portions of the source file into either the symbol table or the output stage. Additionally, operation 320 is similar to operation 220 described above and generates a common language file. Following operation 320, operational flow 33 ends at 322. The common language file can then be consumed by either other front end systems 22, 46, 56, 58 or 60 (FIGS. 1, 2 and 3), or an execution environment, such as environment 74 (FIG. 3).

In yet another embodiment (not shown), the library file name may be added as a command line option. In such a case the compiler loads the metadata information into the symbol table prior to the parsing of the source language file.

In order to modify an existing front end compiler for an existing source language, such as Pascal, COBAL, C++, etc., so that it has the same functionality of the front end system 22 (FIG. 1) two steps may need to be performed. First, the syntax for the source language of that compiler should be examined to determine whether the source language is adapted to "import" other files. If so, the import capability should be modified to be able to import intermediate file or common language type files, if it is not already suited to do such. If the source language has no "import" functionality, the source syntax should be extended to be able to achieve this import functionality. Then the existing front end compiler system should be modified so that it can read at least the metadata portion of the intermediate file and appropriately handle the metadata. That is, the front end should be able to parse the common language file and convert the type and method information in the metadata into the proper form for the particular symbol table. For each new class that is added to the symbol table, the common language file must be read for the methods that are supported by the new class. If it is desired to also make direct use of the executable instructions of the common language file in the output, the front end may also need to be modified to appropriately read and handle the executable instructions.

In addition to modifying the existing compiler to be able to consume intermediate, common language files, the front end system can be modified to produce common language files. Most existing compilers have a back end portion that produces machine language or some other file. Generally, in order change the compiler to produce common language files, the back end is changed to generate common language instead of machine code or whatever it was producing. Further, the back end is modified to add metadata along with the common language instructions.

The above described system and method provides the ability to create a common language library that can be used by developers using a number of different programming languages. This provides developers the ability to solve a particular problem with one language and another problem with another language, and then write the entire application in yet another language. In essence, the system uses the common language file to convey information about a library from one source language compiler that produced the common language file to another source language compiler that consumes the common language file. One library can be shared across many languages such that the library does not have to rewritten for each new programming language. Moreover, the common language has metadata that describes the instructions so that the runtime environment can predetermine the layout for different objects used at runtime. Additionally, this system may be configured to optionally handle languages that specify, prior to runtime, the layout of methods and fields.

Although the invention has been described in language specific to structural features and/or methodological steps, it is to be understood that the invention defined in the appended claims is not necessarily limited to the specific features or steps described. As an example, other source languages may be included in the front end portion in combination with the first source and the common languages. Therefore, the specific features and steps are disclosed as preferred forms of implementing the claimed invention.

What is claimed is:

1. A front end compiler system for generating code to be used by an execution environment, said front end system comprising:
   a metadata module that compiles information to produce metadata information;
   a code module that compiles information to produces executable instructions; and
   wherein the metadata information and executable instructions are the result of compiling a source file in a first language and the front end compiler consumes metadata information produced by a different front end compiler as a result of compiling a source file in a second language.

2. A method of compiling a computer program written in a native source language and having an import statement that imports a common language file, said method comprising: parsing the computer program;
   examining each statement during the parsing act and determining if the statement is an import statement related to the common language file;
   if the statement relates to the common language file, reading the common language file into a symbol table;
   if the statement relates to a native language symbol table entry, adding the information into the symbol table; and
   if the statement relates to output generation, supplying the statement to a output generator.

3. A method as defined in claim 2 wherein the common language file is imported by different source language files.

4. A method as defined in claim 2 wherein the common language file is imported by a procedural source language file and an object oriented source language file.

5. A method as defined in claim 2 wherein the computer program is written in a procedural programming language and the common language file is imported by an object oriented source language files.

6. A method as defined in claim 2 wherein the output generator produces a second common language file wherein the second common language file is different from the imported common language file.

7. A method as defined in claim 6 wherein the second common language file has a metadata section and a common language instructions section.

8. A method as defined in claim 7 wherein the act of reading the common library file into a symbol table further comprises reading the metadata into the symbol table.

9. A computer readable medium having stored thereon a data structure comprising a common language file produced by a front end compiler that consumes a native source code file written in a native source code language, wherein the native source code language is one of a plurality of source languages, the common language file comprising:
   a common language instructions section having instructions in a common language, the instructions related to the written program functions of the native source code file and consumed metadata, wherein the metadata describes written program functions of another native source code language file, the common language used to represent the written program functions is adapted to represent written program functions originally written in at least two different source code languages;
   a metadata portion that describes the common language instructions in the common language instructions section; and
   wherein the front end compiler is adapted to compile native source code files and another common language file.

10. A computer readable medium having stored thereon a data structure comprising a common language file produced by a front end compiler that consumes a native source code file written in a native source code language, wherein the native source code language is one of a plurality of source languages, the common language file comprising:
   a common language instructions section having instructions in a common language, the instructions related to the written program functions of the native source code file and consumed metadata, wherein the metadata describes written program functions of another native source code language file, the common language used to represent the written program functions is adapted to represent written program functions originally written in at least two different source code languages;
   a metadata portion that describes the common language instructions in the common language instructions section; and
   wherein the compiler is adapted to compile a native source code file, the native source code file utilizing a common language library, and wherein the common language library is consumed by different front end compilers associated with different native source code languages.

* * * * *